United States Patent
Berlitz et al.

(10) Patent No.: US 10,645,529 B2
(45) Date of Patent: May 5, 2020

(54) MOTOR VEHICLE

(71) Applicant: Audi AG, Ingolstadt (DE)

(72) Inventors: Stephan Berlitz, Schrobenhausen (DE); Friedrich-Uwe Tontsch, Ingolstadt (DE); Julia Kastner, Beilngries (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/075,232

(22) PCT Filed: Feb. 1, 2017

(86) PCT No.: PCT/EP2017/052153
§ 371 (c)(1),
(2) Date: Dec. 5, 2018

(87) PCT Pub. No.: WO2017/134105
PCT Pub. Date: Aug. 10, 2017

(65) Prior Publication Data
US 2019/0090091 A1  Mar. 21, 2019

(30) Foreign Application Priority Data
Feb. 3, 2016 (DE) .................. 10 2016 001 176

(51) Int. Cl.
*H04W 4/02* (2018.01)
*B60Q 3/78* (2017.01)
(Continued)

(52) U.S. Cl.
CPC ............ *H04W 4/023* (2013.01); *B60K 35/00* (2013.01); *B60K 37/04* (2013.01); *B60Q 3/78* (2017.02);
(Continued)

(58) Field of Classification Search
CPC .................................................. H04W 4/023
(Continued)

(56) References Cited

U.S. PATENT DOCUMENTS 9,000,671 B2  4/2015  Larsson
2006/0271261 A1  11/2006  Flores et al.
(Continued)

FOREIGN PATENT DOCUMENTS

DE       10039131 A1    4/2001
DE   102009010614 A1   10/2009
(Continued)

OTHER PUBLICATIONS

International Search Report and Written Opinion directed to related International Patent Application No. PCT/EP2017/052153, dated May 9, 2017, with attached English-language translation; 14 pages.
(Continued)

*Primary Examiner* — Chuck Huynh
(74) *Attorney, Agent, or Firm* — Sterne, Kessler, Goldstein & Fox P.L.L.C.

(57) ABSTRACT

A motor vehicle is disclosed that includes at least one linear lighting means for directly and/or indirectly lighting a vehicle interior. A position-sensing unit senses ego information describing a position and an orientation of the motor vehicle. A control device determines, from location information describing the position of a person, and from the ego information, direction information describing a direction of the person in relation to the motor vehicle (1), selects, in accordance with the direction information, a sub-group of lighting segments that includes at least one lighting segment to be activated, and activates the lighting segment belonging to the sub-group in accordance with a configuration, which specifies the lighting brightness and/or the lighting color of the lighting segment, and which visualizes the position of the person.

10 Claims, 2 Drawing Sheets

(51) Int. Cl.
    *B60Q 9/00*     (2006.01)
    *G01C 21/26*     (2006.01)
    *G01C 21/36*     (2006.01)
    *B60K 35/00*     (2006.01)
    *B60K 37/04*     (2006.01)
    *H04W 4/40*     (2018.01)

(52) U.S. Cl.
    CPC .............. *B60Q 9/00* (2013.01); *G01C 21/265* (2013.01); *G01C 21/3626* (2013.01); *G01C 21/3644* (2013.01); *G01C 21/3661* (2013.01); *H04W 4/026* (2013.01); *H04W 4/40* (2018.02); *B60K 2370/188* (2019.05); *B60K 2370/332* (2019.05); *B60K 2370/336* (2019.05); *B60K 2370/338* (2019.05); *B60K 2370/563* (2019.05); *B60K 2370/741* (2019.05); *G01C 21/3641* (2013.01)

(58) Field of Classification Search
    USPC ...................................................... 455/414.1
    See application file for complete search history.

(56) References Cited

U.S. PATENT DOCUMENTS

2009/0231116 A1* 9/2009 Takahashi .............. B60K 35/00
    340/461

2011/0084852 A1* 4/2011 Szczerba ............ G01C 21/3626
    340/905
2014/0092127 A1* 4/2014 Kruglick ................. G06F 21/84
    345/629
2017/0034110 A1* 2/2017 Bijor ....................... H04L 51/32

FOREIGN PATENT DOCUMENTS

| DE | 102009053707 A1 | 5/2011 |
| DE | 102011121392 A1 | 6/2013 |
| DE | 102012009338 A1 | 11/2013 |
| EP | 2902745 A1 | 8/2015 |

OTHER PUBLICATIONS

International Preliminary Report on Patentability directed to related International Patent Application No. PCT/EP2017/052153, dated Oct. 5, 2017, with attached English-language translation; 12 pages.
English-language abstract of German Patent Application Publication No. 10039131 A1, published on Apr. 12, 2001; 1 page.
English-language abstract of German Patent Application Publication No. 102009053707 A1, published on May 19, 2011; 1 page.
English-language abstract of German Patent Application Publication No. 102011121392 A1, published on Jun. 20, 2013; 1 page.
English-language abstract of German Patent Application Publication No. 102012009338 A1, published on Nov. 14, 2013; 1 page.
English-language abstract of European Patent Application Publication No. 2902745 A1, published on Aug. 5, 2015; 1 page.

* cited by examiner

MOTOR VEHICLE

TECHNICAL FIELD

The present disclosure refers to a motor vehicle, comprising at least one linear lighting means for directly and/or indirectly lighting a vehicle interior and a position-sensing unit for sensing ego information describing a position and an orientation of the motor vehicle. The lighting means extends, at least in some sections, horizontally along at least one component of the motor vehicle.

BACKGROUND

Motor vehicles with linear lighting means are known. These lighting means are typically used for ambient lighting, which is prevalently used for the esthetic improvement of the passenger compartment of the vehicle and for highlighting contours of the at least one component in the context of a particular design concept.

In recent times, the use of social networks on the Internet has increased dramatically. If people present in a friends or contact list of a user, carry a positioning means, such as a mobile phone, on them, their instant position may be determined and may be provided, through the social network to other users. The latter may acquire information on whether their friends are hanging around in their immediate vicinity. A driver of the motor vehicle, who wishes to get information on the current position of friends from the social network, should, to this end, divert their view from the traffic and take a look at their mobile phone. Such distractions should however be avoided while driving a vehicle.

BRIEF DESCRIPTION OF THE DRAWINGS/FIGURES

DETAILED DESCRIPTION

Figure 1:
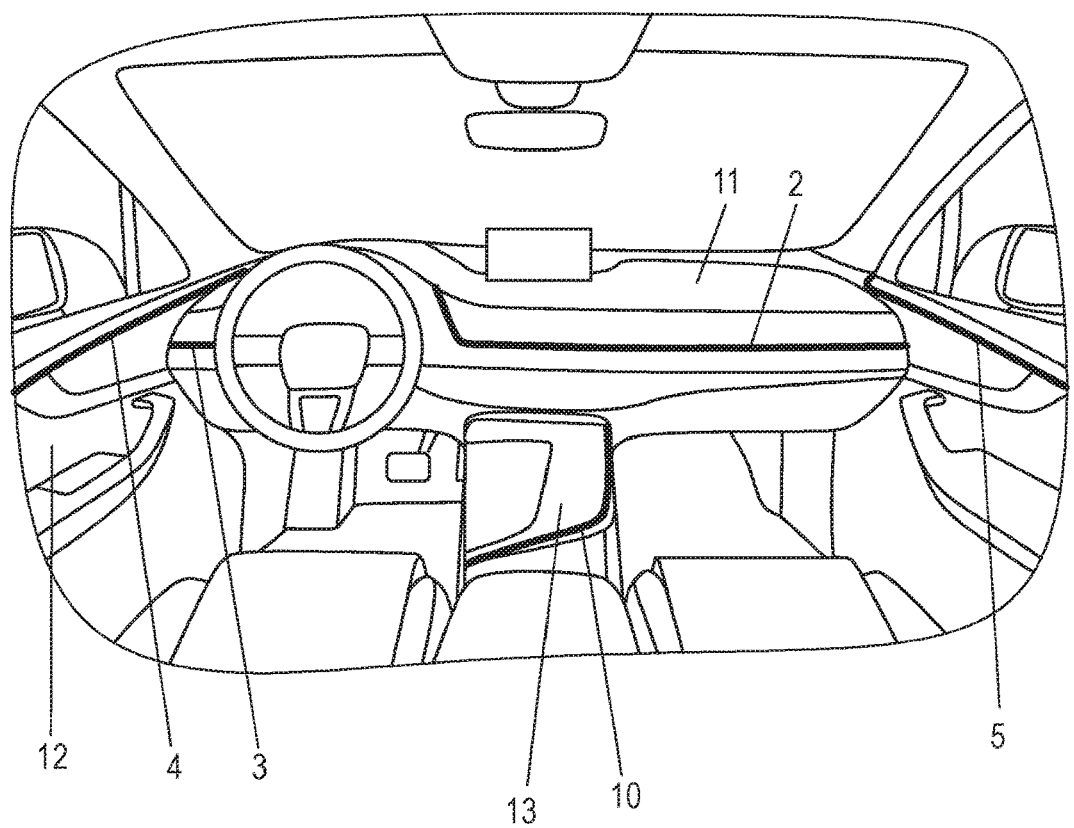
FIG. 1 shows a perspective view of the passenger compartment of an embodiment of an inventive motor vehicle.

The object of the disclosure is thus to provide a visualization of friends from a social network in a motor vehicle without distracting the driver while driving the vehicle.

This object is achieved, according to the disclosure, by a motor vehicle of said type, wherein the lighting means is divided horizontally into a plurality of lighting segments, which each have a fixed emission profile. The motor vehicle has a control device, which is configured to carry out multiple operations, including:

(1) determine, from location information provided through a communication device of the motor vehicle and describing the position of a person, and from the ego information, direction information describing a direction of a person in relation to the motor vehicle, (2) select, in accordance with the direction information, a sub-group of lighting segments comprising at least one lighting segment to be activated, and (3) activate the respective lighting segment belonging to the sub-group in accordance with a configuration, which specifies the lighting brightness and/or the lighting color of said lighting segment and which visualizes the position of said person.

The invention is based on the idea that the linear lighting means is composed of a plurality of lighting segments, and that at least one of these lighting segments is controlled in such a way that a passenger of the motor vehicle, in particular the driver, obtains a visual clue regarding a person, which in particular is signed in an Internet-based social network. The control device initially determines a direction information which describes the direction of the person in relation to the motor vehicle, according to the position and the orientation of the motor vehicle described by the ego information and the position of the person described by the location information. The direction information may for example be determined as an azimuth angle, in particular with respect to the vehicle longitudinal axis. The location information may be provided as a coordinate of the position of the person in a geodetic coordinate system. For providing the location information, a communication device is provided, which may retrieve the location information from a vehicle-external Internet server. The communication device itself may for example provide a wireless connection to the Internet or may be connected to a portable data communication apparatus, such as a mobile phone, through Bluetooth, for example.

The control device then determines, from the direction information, a sub-group of at least one lighting segment, with which the position of a person may be visualized. The sub-group may only comprise one but also a plurality of lighting segments. Moreover, the control device is adapted in such a way that at least one lighting segment of this sub-group is controlled according to a configuration which determines its lighting brightness an/or lighting color. By selecting a configuration of the sub-group, which may be differentiated by a passenger of the motor vehicle from the lighting color and/or the configuration of other lighting segments, an indication regarding the position of the person, i.e. the respective visualization, is provided.

The linear lighting means preferably extends essentially in a horizontal direction. For example, at least 70 percent or at least 90 percent of its linear length may be horizontal. The profile of the lighting means may deviate from the horizontal by a slight curvature, the radius of which is in particular larger than the vehicle width, in order to follow a profile of the component, for example. The individual lighting segments may have a respective lighting element, or may be composed of a group of lighting elements, which are jointly controlled. It is also possible that the motor vehicle comprises a plurality of the linear lighting means, which extend horizontally in the peripheral direction of the vehicle passenger compartment while being adjacent to each other or separated from each other. A lighting element may be an RGB-LED (red, green, blue light-emitting diode), for example, the lighting color and/or lighting brightness of which may be preset in particular by pulse width modulation. The control of the lighting brightness and/or of the lighting color may occur by a control device, which is associated to the lighting means, but may also occur through a central control device, which controls a plurality of lighting means. The preset of the individual pulse widths or of a control signal for the pulse width modulation may occur, for example, via a vehicle bus.

In an embodiment, in or on the motor vehicle at least one brightness sensor is provided for detecting the ambient brightness, wherein the brightness of the lighting segments may additionally be controlled according to the ambient brightness.

The control device may be provided as a navigation device in the motor vehicle or as part thereof. The position detection unit is advantageously based on a satellite-assisted position detection, such as GPS or Galileo. The position detection unit may be integrated in the navigation device.

Through the inventive motor vehicle the advantage is thus obtained that lighting means used on conventional motor vehicles only for ambient illumination may also be used additionally for conveying information to the vehicle's passengers, in particular in relation to persons signed in to social networks. To this end, the subdivision of the lighting means into a plurality of lighting segments is used for said visualization of the position of the person, so that a passenger of the vehicle, in particular the driver, may acquire this information, without being distracted from driving.

The control device may also be adapted to select the sub-group in such a way that it comprises a lighting segment, which, from the point of view of at least one passenger of the motor vehicle, is positioned on a line with the position of the person. To this end, the control device may consider, for example, information regarding a seating position of the passenger, when selecting the sub-group, so that a correct perspective visualization of the position of the person may be obtained. Since already a multiplicity of possible solutions are known in the art for determining the direction of view and/or the position of the head and/or of the eyes of the passenger, it may advantageously be possible to take this information into account when selecting the sub-group. To this end, the motor vehicle may in particular be provided with a camera detecting the passenger.

Moreover, in the inventive motor vehicle, it is also advantageous, if the control device is also adapted for selecting the sub-group and/or for adapting the configuration according to the location information and/or a personal information describing a property of the person. Such properties may in particular be an ordination characteristic, according to which many people signed in to the social network are collectively grouped into virtual groups (such as close friends, relatives, business partners). The affiliation to such a group may be visualized for example by the lighting color of the lighting elements of the sub-group. It may also be conceived, that the number of lighting elements of the selected sub-group is selected according to the property of said person, at a higher or lower level. In a particularly preferred case, the number of elements of the sub-group are selected according to the distance, determined from the location and the ego information of the person to the motor vehicle. Various intervals of distances may for example be respectively associated to a different number of lighting elements. This allows a particularly simple estimate of the distance of the person to the driver or motor vehicle.

In the inventive motor vehicle, an acoustic and/or an optical output device adapted for displaying texts and/or graphics may be provided, which may be controlled by the control device in order to output an indication information for the person who is visualized. The indication information may be derived from data retrieved by the communication device from the social network. In particular, the name of the person may be displayed or acoustically output. Similarly the indication information may also describe the distance between the person and the motor vehicle.

The indication information may also describe a possible wireless contact to that person provided by the communication device, wherein the control device may also be configured for controlling, in case of a control input by the passenger, requiring the establishing of a communication connection through the contact link, the communication device for establishing the communication connection. The wireless connection contact may for example be the mobile phone number of said person, wherein the passenger is thus able to call the visualized person. To this end, the communication device itself may initiate such a call or may control a mobile phone connected thereto in order to initiate the call.

The inventive motor vehicle may be provided with a geodata unit and/or camera providing topographic information regarding the area of the motor vehicle, wherein the control device may be adapted for determining, based on the topographic information and the location information, a visibility information describing the visibility of the person for at least one passenger of the moor vehicle, and only if a visibility information confirms the visibility, for activating the respective lighting segment included in the sub-group, according to the configuration. The topographic information describe in particular height information of buildings or other objects, which may hinder the visibility of the person, and may be retrieved from the geodata unit, which may in particular be also part of the navigation device. Alternatively or additionally, a camera may detect the area of the motor vehicle and determine, based on the acquired surrounding data, whether the position, at which the person to be visualized is present, is covered by objects. The driver thus only is presented with persons, who are then also effectively visible. In case of a negative visibility information it may be foreseen, that the control device controls the lighting segments of the sub-group in order to produce an ambient illumination together with the remaining lighting segments of the at least one lighting means.

The control device may also be adapted for selecting, for a plurality of passengers of the motor vehicle, a respective position of a person to be visualized, and for determining, for the selected positions of said persons, a respective direction information, for selecting the sub-group and for activating the corresponding lighting segments. The lighting color used for visualization may be determined according to the passenger, for which the visualization is taking place. A plurality of positions of people to be visualized may be selected simultaneously according to the specific passengers.

In the inventive motor vehicle, the component may be a dashboard and/or a door and/or a body column and/or a central console of the motor vehicle. A plurality of linear lighting means may be preferably used, which are positioned on a respective component of the motor vehicle. For instance, at least one lighting means may be provided along the dashboard and one of the lighting means may be respectively provided along the doors of the motor vehicle. Lighting means may be provided exclusively on the front doors or on the front and rear doors of the motor vehicle. An at least section-wise running lighting central line may be provided, which allows, on one hand, an ambient illumination of the motor vehicle, and on the other hand, the visualization of the at least one destination.

The horizontal extension of the lighting segments in the inventive motor vehicle may be between 2 mm and 100 mm. The horizontal extension may in particular be at least 5 mm or at least 10 mm and/or at most 50 mm or 30 mm. The width of the linear lighting means in the vertical direction may be smaller than 2 mm or smaller than 1 mm. The width is preferably 0.8 mm. The lighting means may comprise a shared diffusor for all or a plurality of diffusors for the individual lighting segments and/or it may be positioned within the motor vehicle in such a way that a further vehicle component is irradiated for the indirect illumination of the vehicle compartment.

Further advantages and details of the invention are obtained from the following exemplary embodiments and from the drawings, which are schematic representations.

Figure 2:
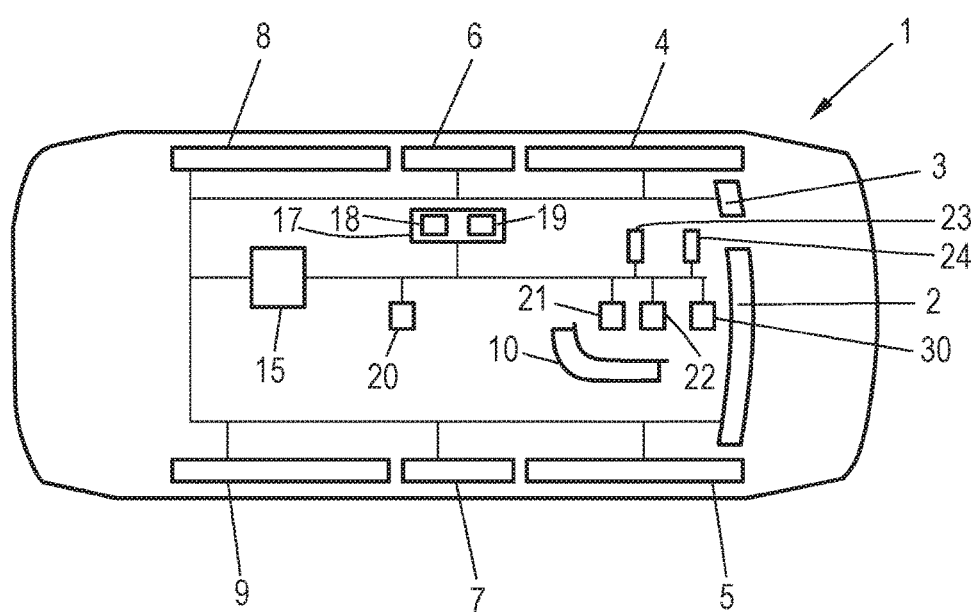
FIG. 2 shows a schematic representation of the motor vehicle shown in FIG. 1 with the components relevant for the control of lighting means.

FIGS. 1 and 2 show different views of a motor vehicle 1, wherein FIG. 1 schematically shows a perspective representation of the passenger compartment of the motor vehicle 1 and FIG. 2 shows the components relevant to the following explanation and their communication. The motor vehicle 1 has a plurality of linear lighting means 2-10, which are used for the direct illumination of the passenger compartment of motor vehicle 1. In an alternative embodiment, it would be possible, as an addition or an alternative to linear lighting means 2-10 for direct illumination, to provide additional or alternative linear lighting means, which indirectly illuminate the passenger compartment, in that they irradiate further motor vehicle components, such as a fabric lining of a door. The following description regarding the linear lighting means 2-10 for direct illumination may also be transferred to such indirectly illuminating lighting means.

The lighting means 2-10 extend at least in sections, horizontally along various components of the motor vehicle 1. The lighting means 2 and 3 extend along the dashboard 11 and the lighting means 4 and 5 extend along a profile of the front doors 12 of motor vehicle 1. The lighting means 6 and 7 extend horizontally as an extension of the lighting means 4 and 5 along the B columns, not shown, of motor vehicle 1 and lighting means 8, 9 extend this line formed by lighting means 4 and 6 or 5 and 7 along the rear doors, not shown, of motor vehicle 1. Thus, the lighting means 2-9 essentially form a lighting line surrounding the lateral and front periphery of the motor vehicle 1, apart from some interruptions, in order to illuminate the compartment of motor vehicle 1. In order to further highlight the contours of the motor vehicle 1, the linear lighting means 10 is additionally provided, which extends along the profile of the central console 13 of motor vehicle 1.

Figure 3:
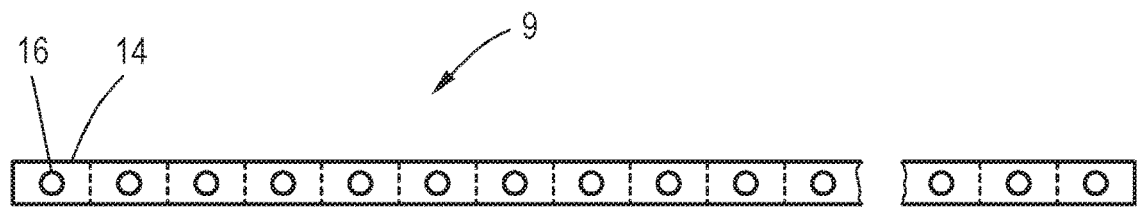
FIG. 3 shows a detailed view of a lighting means of the motor vehicle of FIG. 1.

A detailed representation of lighting means 2-10 is shown in the example of lighting means 9 of FIG. 3. The lighting means 9 has a plurality of lighting segments 14, which respectively have a fixed preset emission profile and which may be separately controlled by the control device 15 of the motor vehicle for setting the lighting brightness and/or color of lighting segments 14. The individual lighting segments 14 have a respective lighting element 16, which may be an RGB-LED, for example, the lighting brightness and/or color of which may be controlled by the control device 15. A diffusor, not shown, is positioned between the individual lighting elements 16 and the passenger compartment, wherein the diffusor diffuses the light of the individual lighting elements 16 in such a way that when operating neighboring lighting segments 14, in the horizontal direction an essentially homogeneous lighting brightness and color are obtained.

Referring again to FIG. 2, the motor vehicle 1 is provided with a navigation device 17 with an integrated position detecting unit 18. By means of the position detecting unit 18 an ego information describing a position and orientation of the motor vehicle 1 in a geodetic coordinate system may be determined. The navigation device 17 also comprises a geodata unit 19, in which topographic information regarding the area of the motor vehicle 1 are stored.

The motor vehicle 1 also comprises a communication device 20, by which an Internet connection may be established. The Internet connection is established directly through the communication device 20. In an alternative embodiment, the communication device 20 connects to a mobile phone, not shown, of a passenger of the motor vehicle, via Bluetooth, wherein the mobile phone establishes the Internet connection. The communication device 20 provides the control device 15 information retrieved from an Internet-based social network regarding a person signed therein. The information comprises in particular a location information, which describes the persons' position, and a personal information, describing properties of said person. Moreover, the control device 15 derives indications from the retrieved information, which comprise the name of the person and a contact over their mobile phone.

The motor vehicle 1 also comprises a camera 21, which detects its passenger compartment, and further cameras, which detect the area of the motor vehicle 1, wherein only camera 22 is illustratively shown. Image data coming from these further cameras may be used as topographic information, alternatively or additionally to those provided by the geodata unit 19. Also an optical output device 23 for displaying texts and graphics, and an acoustic output device 24 are provided.

Figure 4:
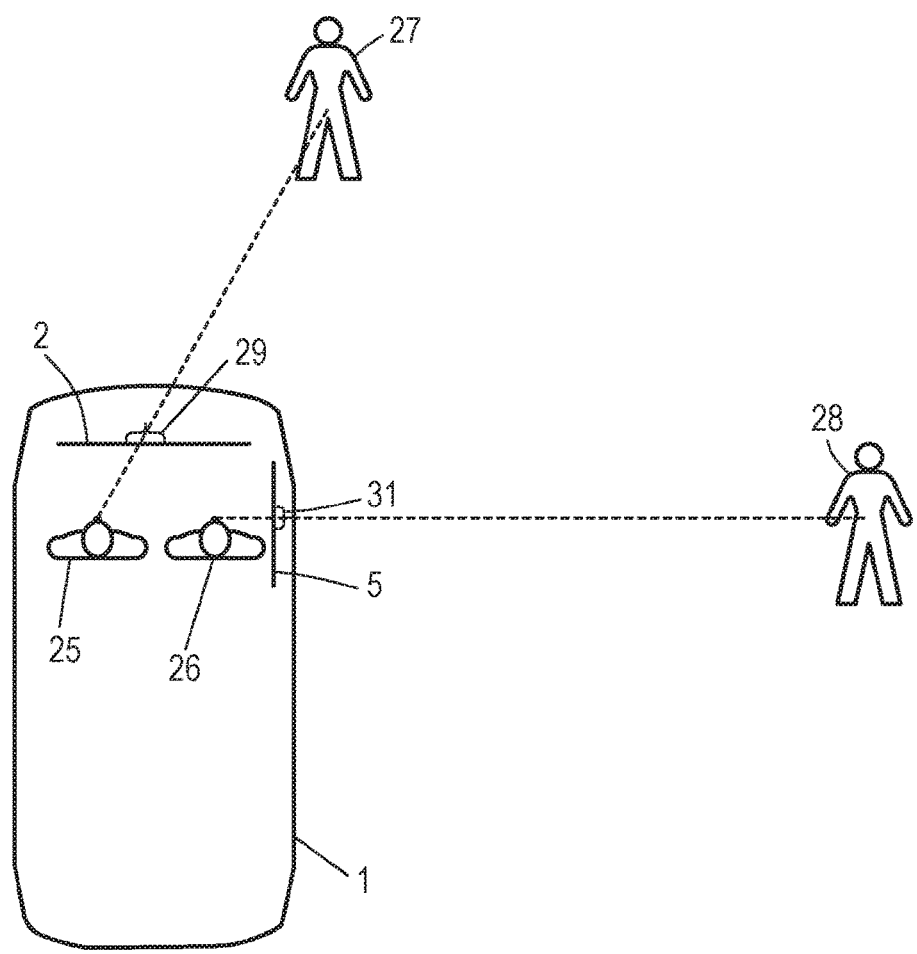
FIG. 4 shows the motor vehicle of FIG. 1 in an exemplary driving situation.

FIG. 4 shows an exemplary driving situation of the motor vehicle 1, in which a first passenger 25 and a second passenger 26 are present. In the area of the motor vehicle, two persons 27, 28 are present, who are signed in to a social network, the users of which are the first passenger 25 and the second passenger 26. Based on this driving situation, in the following the operation of the control device 15 is explained in relation to the visualization of person 27 for the first passenger 25 and of person 28 for the second passenger 26.

Initially, the communication device 20 of the control device 15 provides a location information in the form of geodetic coordinates of the position of person 27. The position detecting unit 18 provides an ego information describing the position and orientation of the motor vehicle 1. The control device 15, based on the location information and the ego information, determines a direction information describing the direction of the position of person 27 in relation to motor vehicle 1.

Subsequently, the control device 15 selects a sub-group 29 of lighting segments 14 of the lighting means 2 in such a way that it comprises those lighting segments, which, from the point of view of the first passenger 25 of the motor vehicle 1 are on a line of position of person 27. To this end, the control device 15 receives from camera 21 information regarding the eye position of passenger 25 and determines, therefrom, an intersection of the linear lighting means 2 with the line connecting the eye position and the position of person 27. In addition, the control device 15 determines, based on the ego information and the location information, the distance of person 27 from vehicle 1 and determines the number of lighting elements 14 of sub-group 29 depending on the distance, wherein different distance intervals are respectively associated to a different number of lighting elements 14. In case of reduced distance, a greater number of lighting elements 14 is selected than in the case with a greater distance.

The control device 15 then determines from the topographic information a visibility information describing the visibility of the person 27 for the first passenger 25. To this end, the topographic information describes in particular a height profile of the area of the motor vehicle 1 between it and the person 27. If for example a building (not shown), which covers the person 27, is positioned between the vehicle 1 and person 27, then a negative visibility information is determined. The lighting means 2 in case of such a visibility information continues to operate as ambient illumination and person 27 is not visualized.

If, on the contrary, a positive visibility information is provided, then the control device 15 controls the lighting segments 14 of the sub-group 29 according to a configuration setting their lighting brightness and lighting color and visualizing the position of person 27. This configuration is determined by the control device in relation to the lighting color according to a property information retrieved through the communication device 20, which describes the affiliation of person 27 to a virtual group within the social network. If person 27 is classified, for example, as a close friend, another lighting color may be selected with respect to the case when the person 27 is a business partner. At the same time, the control device 15 controls the output devices 23, 24 in order to emit the indication information. As said before, the indication information comprises a wireless contact to person 27. The first passenger 25 may now activate through a manual or voice-operated input device 30 of vehicle 1 a command input, depending on which the control device 15 activates the communication device 20 in order to establish a communication connection according to the described wireless contact link. The contact link may be a mobile phone number of person 27, for example, which is selected by the communication device 20 or a mobile phone connected thereto.

For the second passenger 26, the control device 15 controls a sub-group 31 of lighting segments 14 analogously to the visualization of the position of person 28. It may be seen that person 28 is farther away from vehicle 1 than person 27, so that for this person the sub-group 31 having a smaller number of lighting means 14 than sub-group 29 is selected. The configuration of the lighting segments 14 of sub-group 31 is selected in relation to its lighting color in such a way that person 28 may be differentiated with respect to their affiliation to a virtual group. In an alternative embodiment it may be conceived that the configuration of the lighting color of the lighting segments 14 of sub-groups 29, 31 is set depending on the affiliation of persons 27, 28 to a respective user profile of first passenger 25 and second passenger 26, thus according to the fact that the visualization is provided for the first passenger 25 or the second passenger 26.

The invention claimed is:

1. A motor vehicle, comprising:
at least one linear lighting means configured to directly and/or indirectly light a vehicle interior, the at least one linear lighting means extending, at least in some sections, horizontally along at least one component of the motor vehicle, and being divided horizontally into a plurality of lighting segments, each of the plurality of lighting segments having a fixed emission profile;
a communication device configured to receive location information from a vehicle-external Internet server, the location information describing a position of a person located outside the motor vehicle;
a position-sensing unit configured to sense ego information describing a position and an orientation of the motor vehicle; and
a control device configured to:
 determine, from the location information and ego information, direction information describing a direction of the person in relation to the motor vehicle;
 select, in accordance with the direction information, a sub-group of lighting segments comprising at least one lighting segment to be activated; and
 activate the respective lighting segment belonging to the sub-group in accordance with a configuration, which specifies the lighting brightness and/or the lighting color of said lighting segment and which visualizes the position of the person.

2. The motor vehicle of claim 1, wherein the control device is further configured to select the sub-group in such a way that it includes a lighting segment that is situated, from a point of view of at least one passenger of the motor vehicle on a line with the position of the person.

3. The motor vehicle of claim 1, wherein the control device is further configured to select the sub-group and/or to adapt the configuration in accordance with the location information and/or a personal information describing a property of the person.

4. The motor vehicle of claim 1, further comprising:
an acoustic and/or an optical output device configured to display texts and/or graphics,
wherein the control device is configured to control the acoustic and/or optical output device to output indication information regarding the person.

5. The motor vehicle of claim 4, wherein the indication information additionally describes a wireless contact information to the person, which is provided by the communication device, and
wherein the control device is configured to control the communication device to establish the communication connection if a control input has been provided by the passenger requiring the establishing of a communication connection through a contact link.

6. The motor vehicle of claim 1, further comprising:
a geodata unit configured to provide topographic information regarding an area of the motor vehicle,
wherein the control device is further configured to:
 determine, from the topographic information and the location information, visibility information describing a visibility of the person for at least one passenger of the motor vehicle; and
 control the respective lighting segment belonging to the sub-group, according to the configuration, in response to the visibility information confirming the visibility.

7. The motor vehicle of claim 1, wherein the control device is further configured to:
select, for a plurality of passengers of the motor vehicle, a respective position, to be visualized, of a person and for the selected positions of persons;
determine the direction information;
select the sub-group; and
control the lighting segments associated with the sub-group.

8. The motor vehicle of claim 1, wherein the component is at least one of a dashboard, a door, a body column, or a central console of the motor vehicle.

9. The motor vehicle of claim 1, wherein the external Internet server is a social media server.

10. The motor vehicle of claim 1, wherein the determining of the direction information includes:
calculating a direction of the motor vehicle based on the ego information;
comparing the location information to the direction; and
calculating an angle based on the comparing; and
wherein the activated lighting segment is positioned at the calculated angle.

* * * * *